C. F. CLAWSON.
NUT LOCK.
APPLICATION FILED NOV. 22, 1909.

957,746.

Patented May 10, 1910.

Witnesses
E. E. Hunt,
C. H. Griesbauer.

Inventor
C. F. Clawson
by H. B. Willson & Co.
Attorneys

UNITED STATES PATENT OFFICE.

CHARLES F. CLAWSON, OF MOUNT PLEASANT, IOWA.

NUT-LOCK.

957,746.  Specification of Letters Patent.  Patented May 10, 1910.

Application filed November 22, 1909. Serial No. 529,280.

*To all whom it may concern:*

Be it known that I, CHARLES F. CLAWSON, a citizen of the United States, residing at Mount Pleasant, in the county of Henry and State of Iowa, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a nut lock which will be particularly adapted for use in connection with the nuts of railway fish plates whereby said nuts are securely held against unscrewing from the bolts.

A further object is to provide a nut lock of this character which will be simple and inexpensive in construction, efficient and reliable in operation and well adapted to the purpose for which it is designed.

With the foregoing and other objects in view, the invention consists of certain novel features of construction, combination and arrangement of parts, as will be more fully described and particularly pointed out in the appended claims.

Figure 1:
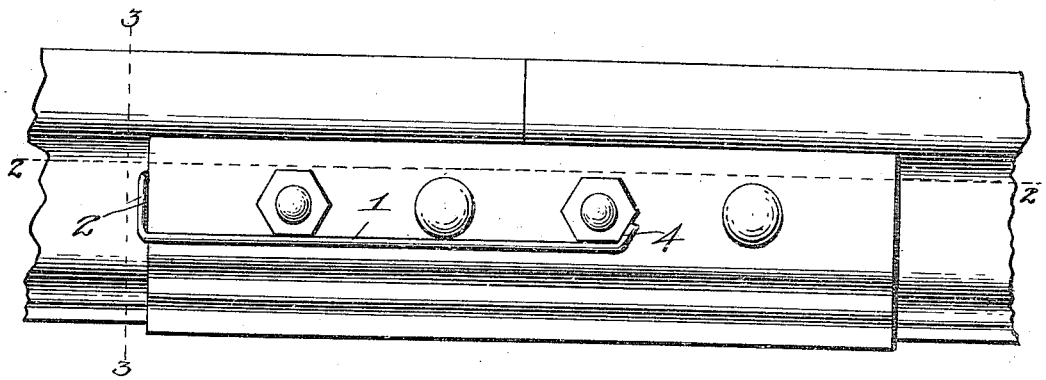
Figure 2:
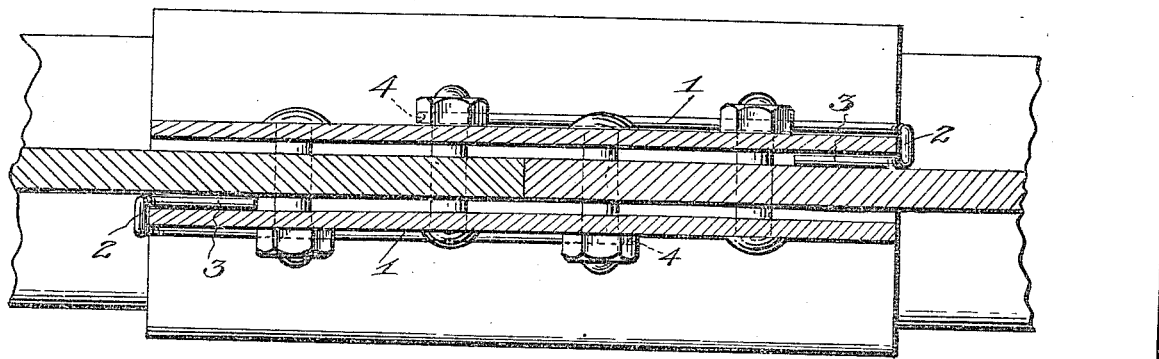
Figure 3:
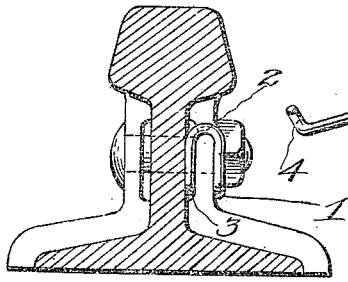
Figure 4:
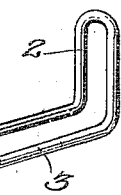

In the accompanying drawings, Figure 1 is a side view of a portion of two railway rails, showing the application of the invention thereto; Fig. 2 is a horizontal section on the line 2—2 of Fig. 1; Fig. 3 is a cross section on the line 3—3 of Fig. 1; Fig. 4 is a perspective view of the lock.

In the embodiment of the invention, I provide a rod or bar 1, which may be of any desired length and is bent at one end to form a right angularly projecting loop 2 and a spring arm 3. At its opposite end, the rod or bar 1 is bent at a slight angle to form a nut engaging finger 4.

In the application of the lock, the spring arm 3 is inserted between the fish plate and the adjacent side of the web of the rail, while the right angularly bent loop 2 engages the end of the fish plate, as shown. When the parts are in this position, the rod or bar will be disposed below and in engagement with the lower sides of the nuts on this side of the fish plate and the rod or bar 1 is made of such length that the angularly bent finger on the end thereof will engage and fit around the last nut of the series. When the rod or bar is thus engaged with the nut, the loop shaped on the end of the rod which bears against the fish plate will prevent the rod from moving downwardly, and the rod will thus be held in engagement with the sides of the nuts, preventing the latter from turning or unscrewing from the bolts. When it is desired to unscrew the nuts, the rod or bar 1 may be sprung downwardly and the lock removed from the fish plate, thus permitting the nuts to be unscrewed.

A nut lock constructed as herein shown and described may be quickly and easily secured to the fish plate of a rail joint and readily detached therefrom when it is desired to unscrew the nuts of the joint.

Particular attention is invited to the extreme simplicity of my improved lock and to the inexpensive construction of the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:—

1. A nut lock of the character described comprising a rod or bar, a right angular loop formed on one end of said rod, a spring fastening arm formed on said loop, and means formed on the opposite ends of the rod to engage one of the nuts whereby the rod is held in position and against longitudinal movement in one direction on the fish plate.

2. A nut lock of the character described comprising a nut engaging rod, a right angular loop formed on one end of said rod, a spring arm formed on said loop and projecting parallel with said rod and adapted to be inserted between the fish plate and the
5 adjacent side of a rail, and an angularly bent finger on the opposite end of said rod to engage one of the nuts to be locked.

In testimony whereof I have hereunto set my hand in presence of two subscribing witnesses.

CHARLES F. CLAWSON.

Witnesses:
C. M. CLARK,
E. POGGE.